Nov. 20, 1934. N. M. STANLEY 1,981,815
EYEGLASS LENS AND METHOD OF MAKING SAME
Filed June 8, 1932 2 Sheets-Sheet 1
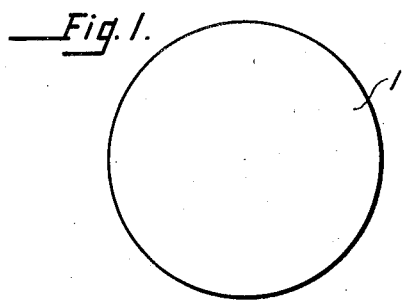
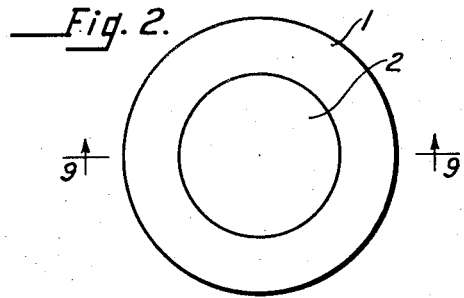
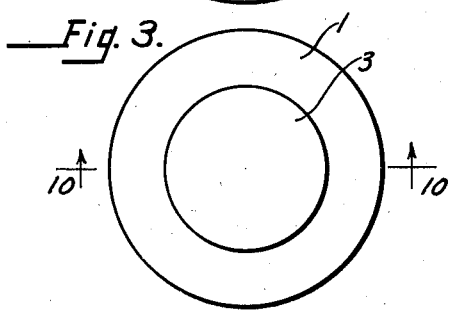
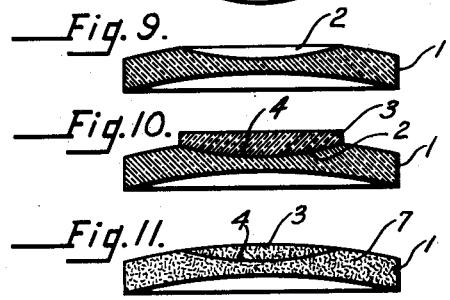
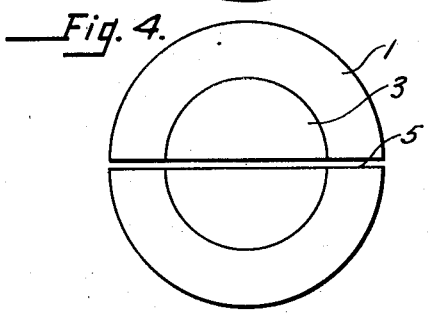
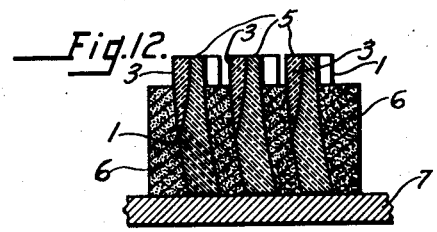
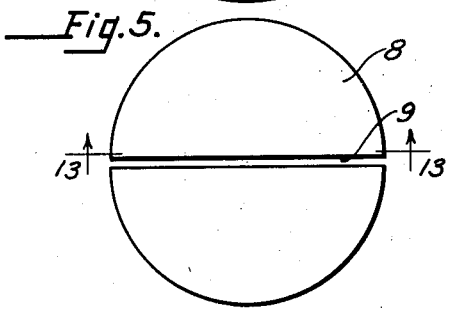
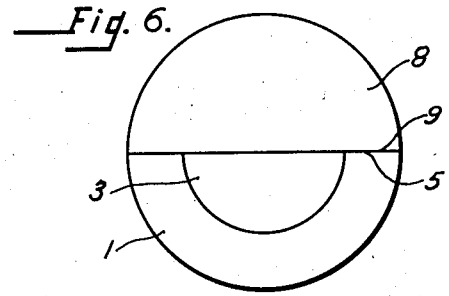
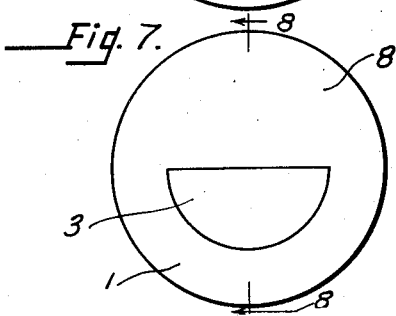
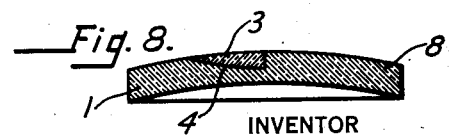
INVENTOR
NATHAN M. STANLEY.
BY
ATTORNEY Nov. 20, 1934.   N. M. STANLEY   1,981,815
EYEGLASS LENS AND METHOD OF MAKING SAME
Filed June 8, 1932   2 Sheets-Sheet 2
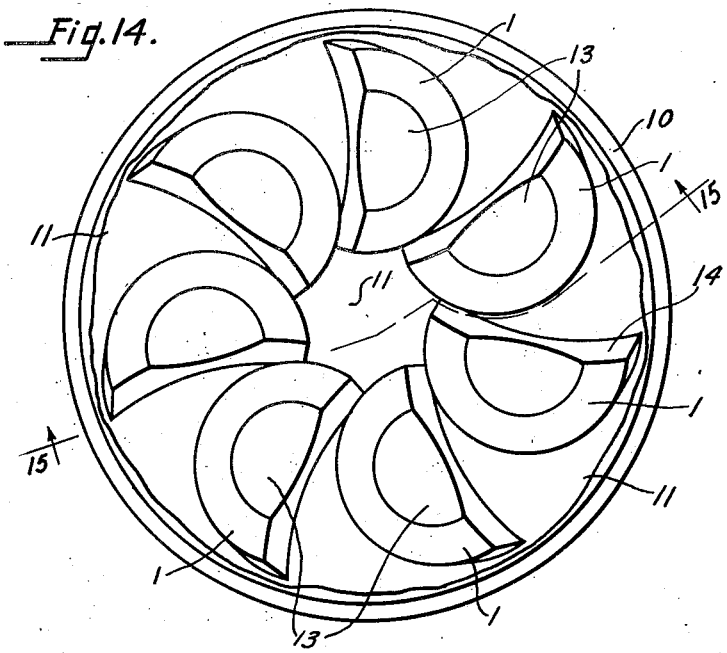
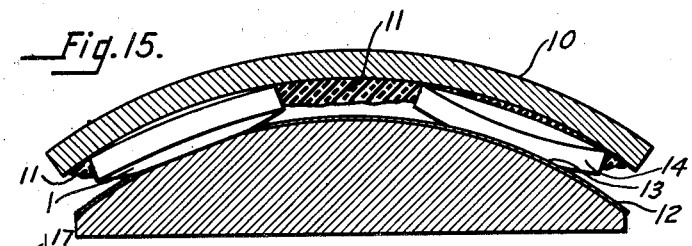
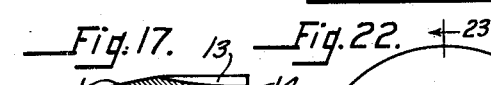
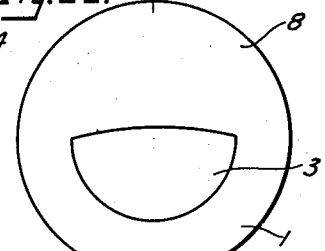
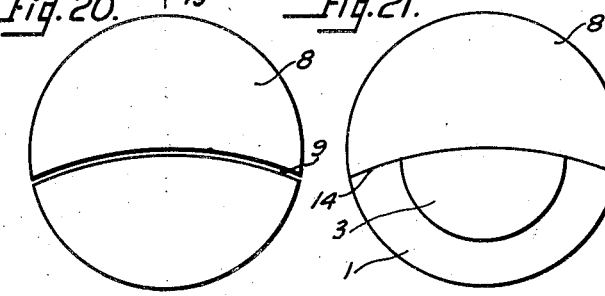
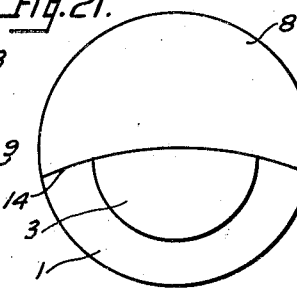
INVENTOR
NATHAN M. STANLEY.
BY
ATTORNEY Patented Nov. 20, 1934

1,981,815

UNITED STATES PATENT OFFICE 1,981,815

EYEGLASS LENS AND METHOD OF MAKING SAME

Nathan M. Stanley, Dayton, Ohio

Application June 8, 1932, Serial No. 616,079

5 Claims. (Cl. 49—82.1)

It is the object of my invention to provide a three-piece bifocal lens.

It is my object to provide an accurately formed insert of one index of refraction supported by and embraced on all sides except its face by a distance lens of another index of refraction without waste of material and at the same time without the necessity of eccentric countersinking and of multiple piece inserts, thereby eliminating the fusing operation necessary for the manufacture of an insert of multiple indices of refraction.

Referring to the drawings, Figure 1 is a circular piece of glass of one index of refraction for distance vision.

Figure 2 shows the face thereof having a concentrically ground circular countersink.

Figure 3 is a plan view of the distance lens in Figure 2 with a circular button or insert fused therein.

Figure 4 shows the completed article in Figure 3 severed in half.

Figure 5 shows a second circular piece of distance glass severed in half to form the upper halves of the completed lens.

Figure 6 shows these completed halves joined together preliminary to fusing.

Figure 7 shows the completed lens fused.

Figure 8 is a section on the line 8—8 through the completed fused lens.

Figure 9 is a section on the line 9—9 of Figure 2.

Figure 10 is a section on the line 10—10 of Figure 3.

Figure 11 is an end elevation of one of the halves shown in Figure 4 after it has been rough ground to impart to it a grey surface.

Figure 12 is a vertical section through the plaster of paris holder for the halves of the lens shown in Figure 4 when they are ground.

Figure 13 is a section on the line 13—13 of Figure 5.

Figure 14 is a plan view of the lens halves after the countersunk portions have been ground therein.

Figure 15 is a section on the line 15—15 of Figure 14, showing the block of lens halves superposed upon a surfacing tool.

Figure 16 is a front elevation of the modified form of the countersunk half of the lens.

Figure 17 is a section on the line 17—17 of Figure 16.

Figure 18 is a front elevation of the countersunk portion of the lens with the insert in position.

Figure 19 is a section on the line 19—19 of Figure 18.

Figure 20 shows a blank severed on an arcuate line.

Figure 21 shows the two halves of the lens abutting one another.

Figure 22 shows a complete fused lens.

Figure 23 is a section on the line 23—23 of Figure 22.

Figure 24 is an end elevation of Figure 18 showing the edges of the insert and of the countersunk half of the main lens suitably greyed.

Referring to the drawings in detail, 1 is a circular piece of glass of an index of refraction suitable for distance vision. A countersink 2 having a spherical surface and circular outline is ground therein. In this countersink is fused in the usual manner a button 3 having a back 4 with a spherical surface. This completed article is then severed along the line 5 in two semicircular parts. These parts are embedded in plaster of paris 6 so that their edges 5 may be ground to impart a grey finish 7 as indicated in Figure 11. If it is desired to remove the grey surface the edges can be polished. These halves with the insert are then removed from the plaster of Paris where they are resting upon the support 77. They are fused edge to edge to the semicircular halves 8 along the edge 9 thereof, which halves form the upper portion of the completed lens. The position of the parts will be seen in Figure 6. The upper halves 8 are formed by splitting the plate 1 in two parts.

The completed lens appears as in Figure 7. The upper and lower halves being of the same index of refraction and of the same type of glass, which is crown glass fused together, either show no junction line or one that is not objectionable due to the grey surface 7. The insert of a different index of refraction marked 3 is located in the proper position in the distance lens. By suitable edging and grinding it may be located eccentrically of the center of the major lens in the usual manner. It is shown in the blank form in Figures 7 and 8.

It will be understood that the surface of Figure 3 is usually ground so that the surface will appear as in Figure 11 rather than as in Figure 10.

The steps of the process comprise the provision of a circular piece of glass 1, the grinding of a countersink 2 in the face thereof, preferably concentrically of the glass 1, fusing a button of a different index of refraction in the face, grinding the face, splitting the completed article in half, treating the edges so split; and then splitting a plain piece of glass 1 in half and either treating or not the edges as may be desired;

and then fusing the plain half to a half carrying a fused insert in the manner described.

Referring to Figures 14 to 24 inclusive, 10 indicates a supporting bowl in which the major lens halves 1 are imbedded in pitch 11. This bowl is inverted and the grinding member 12 grinds the countersunk portions 13 therein. Thus a circular grinding member having a spherical face is adapted to grind semi-spherical countersunk portions out of the lens halves 1. These halves are preferably arcuate on the flat face 14 so that the eye in travelling laterally above the top of the insert 3 will not be interfered with by any remaining line showing the juncture between the upper and lower halves of the major lens when the upper and lower halves are fused to one another. It is therefore feasible to grey the top of the segment by either grinding or etching. If only the top of the segment is given a grey surface, the juncture line between the major portion of the lens being below the general lateral line of vision, such juncture line will not interfere with the vision of the wearer.

If desired, the entire surface of the abutting edge of the lower half of the major lens as well as the top of the segment may be ground to give it a grey surface.

When etching is employed, the lens is embedded in a mixture of beeswax, tallow, colophony and powdered asphalt kneaded together. The entire lens is surrounded except the portion to be etched, or the portion to be etched is surrounded with a rim of the foregoing material to prevent the etching material from spreading over the parts not to be etched.

The etching fluid may be of any desired character, such as commercial hydrofluoric acid in the proportion of 240 cc., 600 grams of powdered crystallized soda and 100 cc. of water. After etching the etched surface can be washed with water. Thereafter the surface is treated with an opaque etching fluid or paste in order to secure a greater degree of opacity or greyness.

Such greyed surfaces are shown in Figure 24. If desired, the upper surface of the combined segment and major portion of the lens may have a curvature such as shown in Figures 16, 18, 20, 21 and 22, and with such a curvature, the line of juncture of the major portion of the lens being below generally the top of the segment, will not interfere with the vision of the wearer, as heretofore described. To grind the halves to this curvature they may be held as indicated in Figure 12.

My preferred form of invention is that shown in Figure 14 for forming the countersink where the countersink is only formed in one half of the lens, thereby forming a semi-circular countersink in which is mounted a semi-circular button. The two are fused together and then a substantially semi-circular major lens portion constituting the top half of the lens is fused to the lower half and to its button or insert segment.

By this manner of construction, the lens of my invention is adapted to easy and economical manufacture. By constructing the lens halves and button halves at the outset, the difficulty of afterward splitting a whole blank after fusing is avoided: in practice it is quite difficult to split any blank, such as that shown in Figure 4, exactly through the center, and the halves usually come out unequal in size. Furthermore, the cut is often uneven, so that the edges must be ground off for several millimeters before the ridges or chipped portions are removed. By constructing the halves separately, each half may be made slightly larger than necessary, and always edged down to exactly the same size. In addition to these advantages, there is no necessity of having to split the blank containing the heavy button, as shown in cross section in Figure 10, an operation which would create a very irregular result.

It will be understood that I desire to comprehend within my invention such modifications as may be necessary to adapt it to varying conditions and uses.

Having thus fully described my invention, what I claim as new and desire to secure by Letters Patent, is:

1. In a method of manufacturing eyeglass lenses, grinding a semi-circular countersink in a semi-circular distance lens, and inserting and fusing a semi-circular button therein.

2. In a method of manufacturing eyeglass lenses, grinding a partially circular countersink in a partially circular distance lens, inserting a partially-circular button therein and fusing, and surfacing an arcuate face on the end of the button and the end of the distance lens.

3. In a method of manufacturing a bifocal eyeglass lens, grinding a semi-circular countersink in a semi-circular distance lens, fusing a semi-circular button insert into said countersink in the distance lens and fusing as an upper half a semi-circular distance lens to the edge of the lower half of the distance lens and the edge of the button insert.

4. In a method of manufacturing an eyeglass lens, forming a countersink of non-circular outline extending to the edge of a piece of glass, securing a non-circular button therein, and uniting the blank thus formed edge-to-edge with another piece of glass.

5. In a method of manufacturing an eyeglass lens, forming a countersink adjacent the edge of a piece of glass, securing a button of partially circular outline therein, surfacing the edge having the button to an even curvature, and uniting the blank thus formed edge-to-edge with another piece of glass having a corresponding edge curvature.

NATHAN M. STANLEY.